United States Patent [19]
Materese

[11] 3,782,550
[45] Jan. 1, 1974

[54] WASTE TREATMENT SYSTEM
[75] Inventor: Vincent Materese, Dayton, Ohio
[73] Assignee: Dayton Manufacturing Company, Dayton, Ohio
[22] Filed: Nov. 5, 1971
[21] Appl. No.: 196,092

[52] U.S. Cl................ 210/134, 210/136, 210/152, 210/199, 210/202, 210/206, 210/236
[51] Int. Cl............................................. C02c 1/40
[58] Field of Search .................. 4/10, 115; 210/60, 210/62, 143, 152, 167, 199, 202, 206, 259, 456, 489, 120, 134, 136

[56] References Cited
UNITED STATES PATENTS

| | | | |
|---|---|---|---|
| 3,666,106 | 5/1972 | Green | 4/115 X |
| 3,539,010 | 11/1970 | Smyers, Jr. | 210/143 |
| 3,587,116 | 6/1971 | Quase | 4/10 |
| 3,595,393 | 7/1971 | Messa et al. | 210/202 X |
| 3,540,590 | 11/1970 | Schneider, Jr. et al. | 210/152 |
| 3,428,184 | 2/1969 | Kuper | 210/489 |
| 3,301,401 | 1/1967 | Hall | 210/456 X |
| 3,655,050 | 4/1972 | Fifer | 210/120 X |

Primary Examiner—Charles N. Hart
Assistant Examiner—Robert H. Spitzer
Attorney—Lawrence B. Biebel et al.

[57] ABSTRACT

A waste treatment system which receives liquid and solid waste, macerates the solids to form a slurry and pumps the slurry to a treatment tank. In the treatment tank the solids are separated from the liquids and retained in the tank, while the liquid effluent is treated chemically to render it pathogenically harmless and discharged from the system.

14 Claims, 13 Drawing Figures

WASTE TREATMENT SYSTEM

BACKGROUND OF THE INVENTION

The treatment of liquid and solid wastes in mobile environments, such as trains, buses, airplanes, and ships, has been the subject of continuing development efforts over a number of years. For example, the U.S. Pat. to Cox, No. 1,996,325 discloses a method of treating sewage, particularly for use in a train or the like, which involves breaking up solid sewage into smaller particles and then treating the sewage with a sterilizing agent in liquid, solid or gaseous form. Similarly, the U.S. Pat. to Wolman, No. 2,658,202 discloses a method somewhat similar to that described in the Cox patent, but in which the sewage is heated to render it pathogenically harmless. A more recent U.S. Pat. to Carlson, No. 3,451,552 discloses a system which is particularly adapted for use in ships, and in which the solid sewage is broken down and the liquids and solids pumped through a bed of disinfectant tablets before being discharged from the system.

SUMMARY OF THE INVENTION

The present invention provides a waste treatment system which is self-contained and extremely compact and which is, therefore, ideally suited for use in a mobile environment.

Specifically, the present invention provides a system in which the liquid and solid wastes are collected, macerated to form a pumpable slurry, and the resulting slurry pumped into a treatment tank associated with the system. In the treatment tank solids are separated out to provide a liquid effluent, which is thereafter chemically treated to render it pathogenically harmless and the treated effluent discharged from the system.

Since the proportion of liquid to solid wastes is normally such that the solids constitute only a minor portion of the total waste material treated, and since treated liquid wastes are continually discharged from the system as they are displaced by incoming charges of raw wastes, despite the fact that the solids are retained in the treatment tank, the system can be used over an extended period of time without an excessively large holding tank.

Preferably the solids are separated from the liquids in a two stage operation. In one embodiment of the invention a series of settling chambers are utilized for the initial separation, while in a second embodiment screens having openings of decreasing size in the downstream direction, are utilized. Both systems thereafter utilize a cylindrical filter to provide final separation of the solids from the liquids.

The resulting liquid effluent passes from the filter into a mixing section of the treatment tank where it is mixed with an additive to render it pathogenically harmless and is thereafter discharged from the system when displaced by an incoming charge of sewage slurry.

In one form of the invention an aspirator is provided on the downstream end of a tube leading from a supply of liquid additive, so that as the filtered liquid flows from the filter it draws treating additive into the mixing chamber for mixture with the liquid effluent.

In another embodiment of the invention a two stage additive tank is utilized including an upper section or reservoir and a lower section or holding tank. A solenoid actuated valve interconnects the reservoir and holding tank and is energized with the macerator pump to transfer additive from the reservoir to the holding tank while the macerator pump is operating. A tube extends from the holding tank to the mixing section of the treatment tank and a one way check valve is provided in the tube to permit flow only into the treatment tank.

Therefore, when the macerator pump is energized, macerating the solid materials and pumping the resulting slurry of liquids and solids into the treatment tank, the tank is under positive pressure, preventing the flow of additives from the holding tank into the treatment tank. Upon termination of the pumping operation, however, vent means in the treatment tank allow it to depressurize, permitting the charge of additives transfered into the holding tank to be discharged therefrom into the mixing section of the treatment tank.

In both embodiments, after the system has been in use for some time, activation of the macerator pump will not only cause the treated slurry and waste materials to be pumped into the treatment tank but will also cause the treated effluent to be discharged by displacement from the mixing section of the treatment tank.

Both embodiment, therefore, provide a compact, self-contained system ideally suited for mobile environments.

DESCRIPTION OF THE PREFERRED EMBODIMENTS

Figure 1:
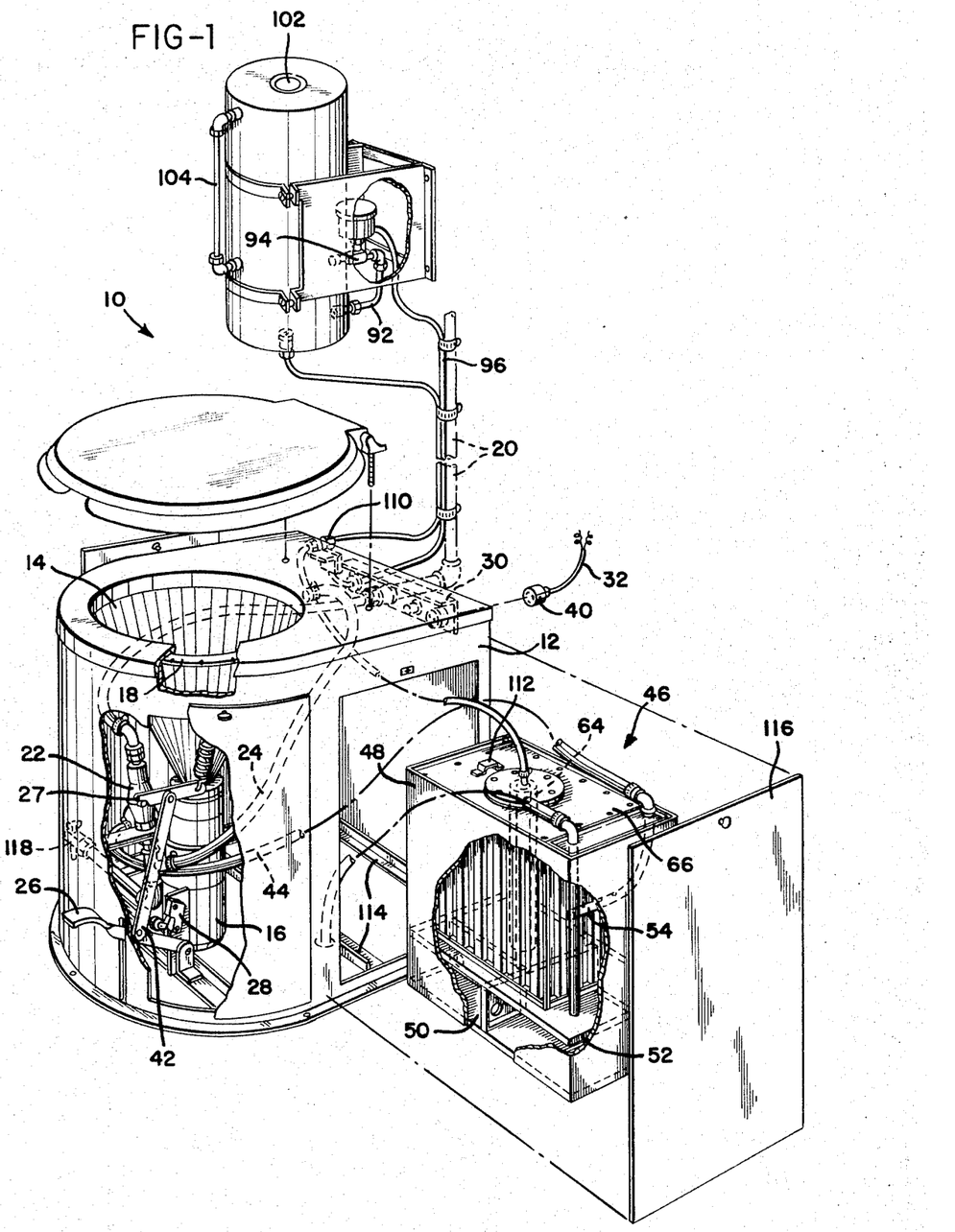
FIG. 1 is an exploded perspective view showing an embodiment of the invention.

With reference initially to FIG. 1 of the drawings, it will be seen that a system 10 in accordance with the present invention includes a housing 12, in which is mounted a bowl 14 discharging at its lower end into a macerator pump 16. A flush ring 18 having a series of openings formed therethrough is positioned about the upper end of the bowl 14 and is supplied with a flushing liquid from any suitable source of supply through a pipe 20, valve 22 and a second pipe 24. It will be seen, therefore, that depressing a foot pedal 26 causes link 27 to open the valve 22 and admit flushing liquid into the bowl around the upper end thereof.

The macerator pump 16 may be of conventional construction and energized through the limit switch 28, which is in electric circuit with the terminal board 30 by means of suitable wiring, which has been omitted for purposes of simplication. Electric current to the board is received from any suitable power source through the cable 32 and plug 40. It will be seen, therefore, that depressing of the foot pedal 26, in addition to opening the valve 22, will cause link 42 to contact the limit switch 28 and energize the macerator pump 16.

This will cause solid waste material to be broken down into fine particles and mixed with liquid waste material, if present, and the flushing liquid to form a pumpable slurry in a well known manner. The macerator pump then pumps this slurry through the line 44 to the treatment tank, referenced in its entirety by the numeral 46.

Figure 2:
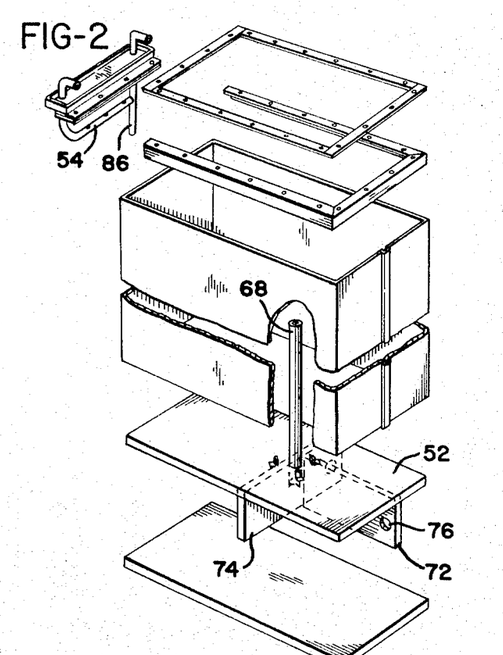
FIG. 2 is an exploded perspective view showing a portion of the treatment tank of FIG. 1.

Treatment tank 46, as best seen in FIGS. 1 and 2 of the drawings, is divided into an upper section 48 and a lower section 50 by a substantially horizontally extending wall 52. Conduit 44 feeds into the upper section 48 by means of a spray nozzle 54 extending across one end of the upper section 48 and having a plurality of outlets therefrom directed upwardly against an outer screen member 56 (see also FIG. 3 of the drawings).

Figure 3:
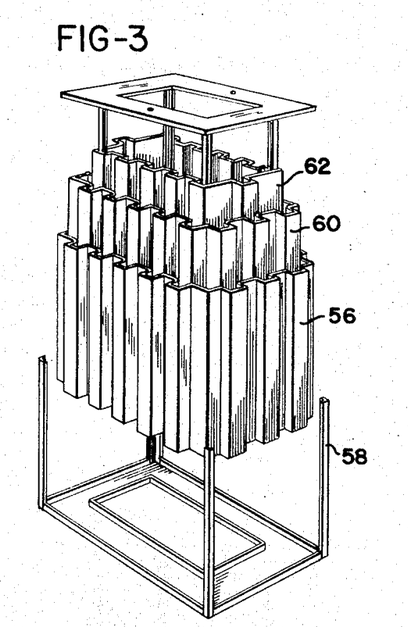
FIG. 3 is another exploded perspective view showing the system of screens utilized in the treatment tank of FIG. 1.

Screen 56 is mounted within the upper section 48 of the treatment tank by frame means 58 and is positioned in encircling relationship to a series of additional screens, two such additional screens 60 and 62 being shown for purposes of illustration, although it will be apparent that the number of screens may be varied as required.

The openings through each of the screens decrease in size from the outermost screen 56 to the innermost screen 62, with screen 62 being of finer mesh than screen 60 and screen 60 being of finer mesh than screen 56. It will also be noted that each of these screens is of corrugated configuration to provide both increased surface area and improve the overall rigidity of the structure.

Figure 4:
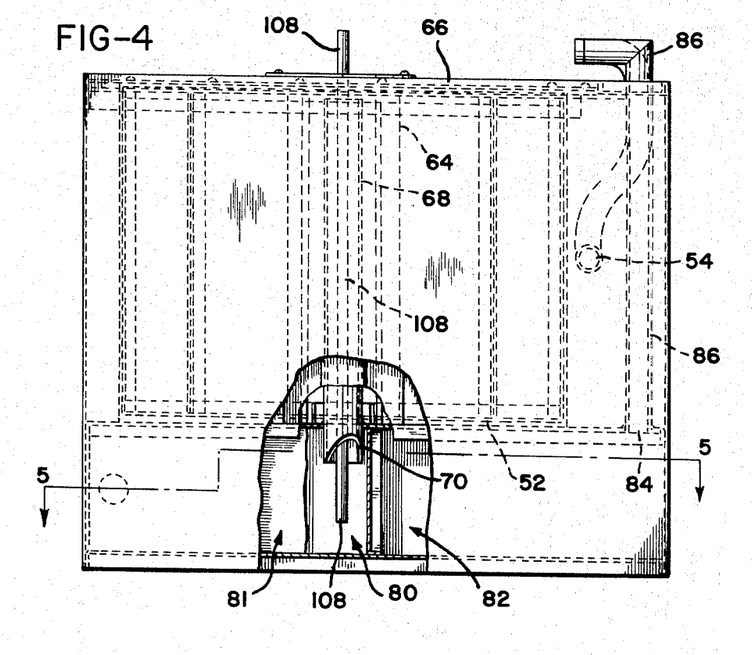
FIG. 4 is an elevational view of the treatment tank of FIG. 1 with parts broken away for clarity.

Positioned concentrically within the innermost screen 62 is an upstanding filter 64 of cylindrical construction. As best seen in FIG. 4 of the drawings, the filter 64 extends from the horizontal wall 52 to a top wall 66 of the treatment tank and encircles a standpipe 68, the outer wall of which is positioned in spaced relationship to the interior surface of the filter 64.

The upper end of the standpipe 68 is spaced beneath the top wall 66 and the lower end of the standpipe extends through an opening in the horizontally extending wall 52 to communicate with the lower section 50 of the treatment tank. The lower end of the standpipe 68 is cut away, as at 70, with the cut away portion directed toward the intersection of two dividing walls 72 and 74 positioned in the lower section 50 of the tank.

Figure 5:
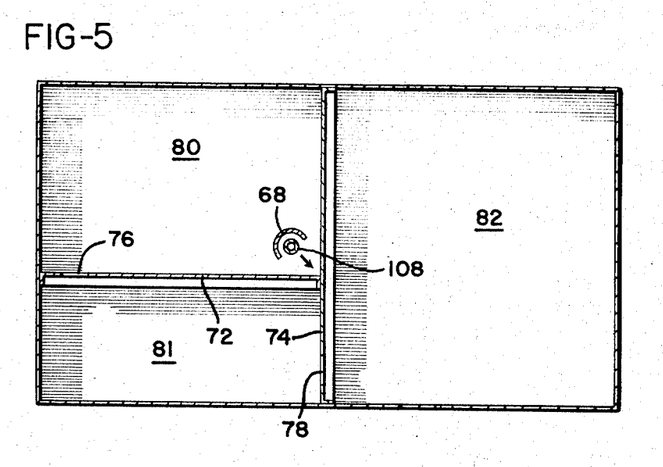
FIG. 5 is a cross-sectional view taken on line 5—5 of FIG. 4.

Wall 72 is provided with an opening 76 therethrough while wall 74 is provided with an opening 78 therethrough. It will be seen, therefore, that the two walls 72 and 74 divide the lower section 50 of the treatment tank into three mixing subsections 80, 81 and 82, serially interconnected by means of openings 76 and 78. The horizontally extending wall 52 is also provided with a discharge opening 84 therefrom communicating with a discharge pipe 86 which extends upwardly through the upper section 48.

Figure 6:
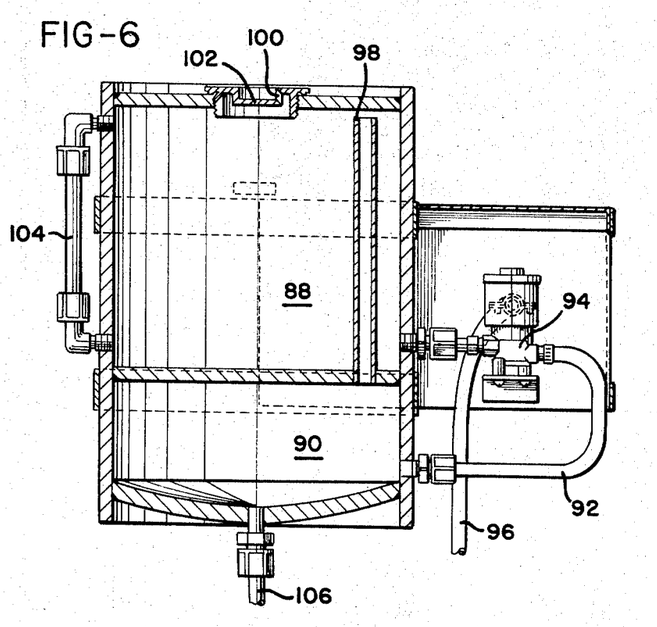
FIG. 6 is a cross-sectional view through the chemical additive tank.

A source of treating additive for the waste material is positioned with respect to the treatment tank such that an additive, preferably in liquid form, can be gravity fed therefrom into the treatment tank. As best seen in FIG. 6 of the drawings, the additive supply includes an upper section or reservoir 88 and a lower section or holding tank 90 communicating with the upper section by means of a conduit 92. A solenoid actuated valve 94 is positioned in the line 92 to control the flow of additive from the upper section 88 to the lower section 90, and this valve may be controlled by means of a cable 96 connected to the terminal strip 30 for actuation by the same limit switch 28 which controls the macerator pump 16.

It will also be noted from FIG. 6 of the drawings that the lower section 90 vents to the upper section 88 by means of the standpipe 98 and the upper section vents to atmosphere through the opening 100 in the filler cap 102. Additionally, a sight gage 104 may be mounted on the upper tank for convenient monitoring of the level of additive therein.

The holding tank 90 feeds by means of the conduit 106 into a vertically extending pipe 108 (see also FIG. 4 of the drawings) which extends through the standpipe 68 into the lower section 50 of the treatment tank. For positive control of flow through the line 106 it may be provided with a one way check valve, 110 which permits gravity flow from the holding tank 90 into the lower section 50 of the treatment tank but prevents reverse therethrough. Of course, the valve 110 may be eliminated and effluent allowed to flow upstream into tank 90. This will not affect the supply in reservoir 88 and will also enhance the mixing of effluent and additive during this reverse flow and subsequent downstream flow into the treatment tank.

Additionally, the top wall 66 of the treatment tank is provided with a one way vent valve 112, which may be of the conventional umbrella type construction, and which allows the tank to be pressurized internally but yet permits inward venting of the tank when pressurizing is terminated.

It will also be noted from FIG. 1 of the drawings that the entire treatment tank 46 is received on rails 114, which permit the tank to be removed for servicing after removal of an access panel 116 or similar panel on the opposite side of the housing. Also, for draining the system, a petcock 118 is installed at the lowest point in the flush water supply line. This way, the water supply line and the valve can be drained, preventing it from freezing.

With the above construction it will be seen that depressing the foot pedal 26 will cause any solid and liquid waste materials deposited in the bowl 14 to be flushed into the macerator pump 16, which is substantially simultaneously energized by depression of the foot pedal 26.

As a result, the solid materials are reduced and mixed with the liquids to form a pumpable slurry and the slurry pumped through the line 44 and the spray nozzle 54 against the outer surface of the outermost screen 56. Depressing the foot pedal 26 will also cause the solenoid actuated valve 94 to open, permitting the additive in the reservoir 88 to flow downwardly through the line 92 into the holding tank 90.

However, because the interior of the treatment tank 46 is being pressurized by the macerator pump 16, the one way check valve 110 is closed and the additive cannot flow past this point in the system. As noted above, pressurization of the treatment tank 46 is enabled by the one way vent valve 112.

The slurry of liquid and solids directed against the outer screen 56 will tend to rinse therefrom any solids which may have accumulated thereon from previous uses. The slurry will then commence to pass through the series of screens, with each screen separating a portion of the solids from the slurry to provide a low consistency slurry, that is, one having a relatively small percentage of solids therein, at the outer surface of the upstanding cylindrical filter 64.

Filter 64 may be formed of any suitable filtering material designed to remove substantially all the remaining solids from the low consistency slurry as the slurry passes through the filter to the interior thereof. When the resulting, substantially liquid effluent accumulates within the filter to a level above the upper end of the standpipe 68 it will pass, by means of the standpipe, through the opening in the horizontally extending wall 52 into the lower section 50 of the treatment tank.

In the meantime, the pedal 26 under normal circumstances having been released by this time, the flow of flushing liquid and the pumping by the macerator pump will have terminated, allowing the treatment tank to depressurize through the one way vent 112. This in turn allows the one way check valve 110 to open and permits the charge of additive transferred into the holding tank 90 to fall by gravity through the line 106 and the pipe 108 into the lower section 50 of the treatment tank.

The additive and effluent are mixed in the first subsection 80 of the lower or mixing section 50 and are further mixed as they flow through the opening 76 into the subsection 81 and the opening 78 into the subsection 82. By the time the mixture of effluent and additive has reached the last mixing subsection 82. The effluent will have been rendered pathogenically harmless. Normally, since there will be some time between uses of the system, the mixed additive and effluent will remain in the last mixing subsection 82 an additional period of time, allowing further sterilizing of the effluent.

After the system has been in operation for a period of time, depending on the capacity of the system and the frequency of usage, the mixing section 50 of the treatment tank will be filled with liquid. Therefore, as additional untreated slurry is pumped into the upper or separator and filter section of the treatment tank, it will displace treated effluent from the downstreammost mixing subsection 82 upwardly through the discharge conduit 86 extending through the upper section 48 for discharge from the system.

The solids deposited in the upper section are, of course, retained therein. However, since the ratio of liquids to solids deposited in the system will normally be quite high, and since the treated liquids are continually discharged from the system by displacement by the raw slurry, the intervals between servicing of the system need not be frequent, even though the capacity of the treatment tank is not overly large.

Figure 7:
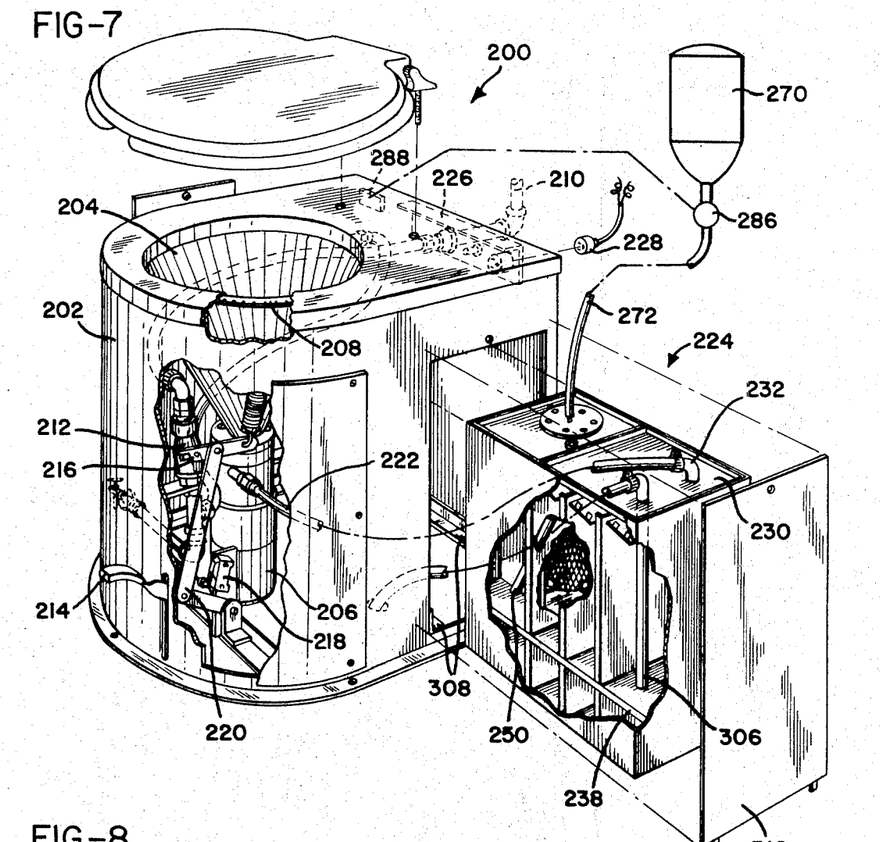
FIG. 7 is an exploded perspective view, similar to FIG. 1, showing a second embodiment of the invention.

Turning now to FIGS. 7 through 13 of the drawings, a second preferred embodiment of the invention will be described. As best seen in FIG. 7 of the drawings, a waste treatment system 200 comprises a supporting frame 202 mounting a waste receiving bowl 204, which communicates at its lower end with a macerator pump 206. Positioned about the upper end of the bowl 204 is a flushing ring 208 having a series of openings formed therein and supplied with a flushing liquid from any convenient source through the pipe 210 and valve 212.

Thus, depressing the foot pedal 214 will cause the link 216 to open the valve 212 and allow flushing liquid to flow through the openings in flushing ring 208 and flush any material in the bowl 204 into the macerator pump 206. Pump 206 is provided with a limit switch 218, which is also actuated when the pedal 214 is depressed by means of the link 220 contacting the limit switch.

This results in any solid material received by the macerator pump being broken down and mixed with the liquid material to form a pumpable slurry, which is thereafter pumped through the line 222 into the treatment tank 224. As in the previous embodiment, the switch 218 may be in circuit with any suitable source of power by means of the terminal strip 226 and the plug 228. Line 222 is attached to the top wall 230 of the waste treatment tank by means of the elbow 232, which opens into the tank just beneath the top wall 230, as best seen in FIG. 10 of the drawings.

The treatment tank 224 is divided into upper and lower sections 234 and 236 by means of a horizontally extending wall 238, with the upper section constituting a separating and filtering section and the lower section comprising a mixing section. As the slurry of liquid and solid materials is ejected through the elbow 232 it strikes a deflector 240 positioned in the upstreammost subsection of the upper section of the treatment tank.

Section 234 of the treatment tank is divided into subsections by a pair of weirs 242 which extend from the wall 238 to a point just short of the top wall 230, thereby dividing a portion of the upper section into separating subsections 244, 246 and 248.

Figures 9, 10, 11, 12, 13:
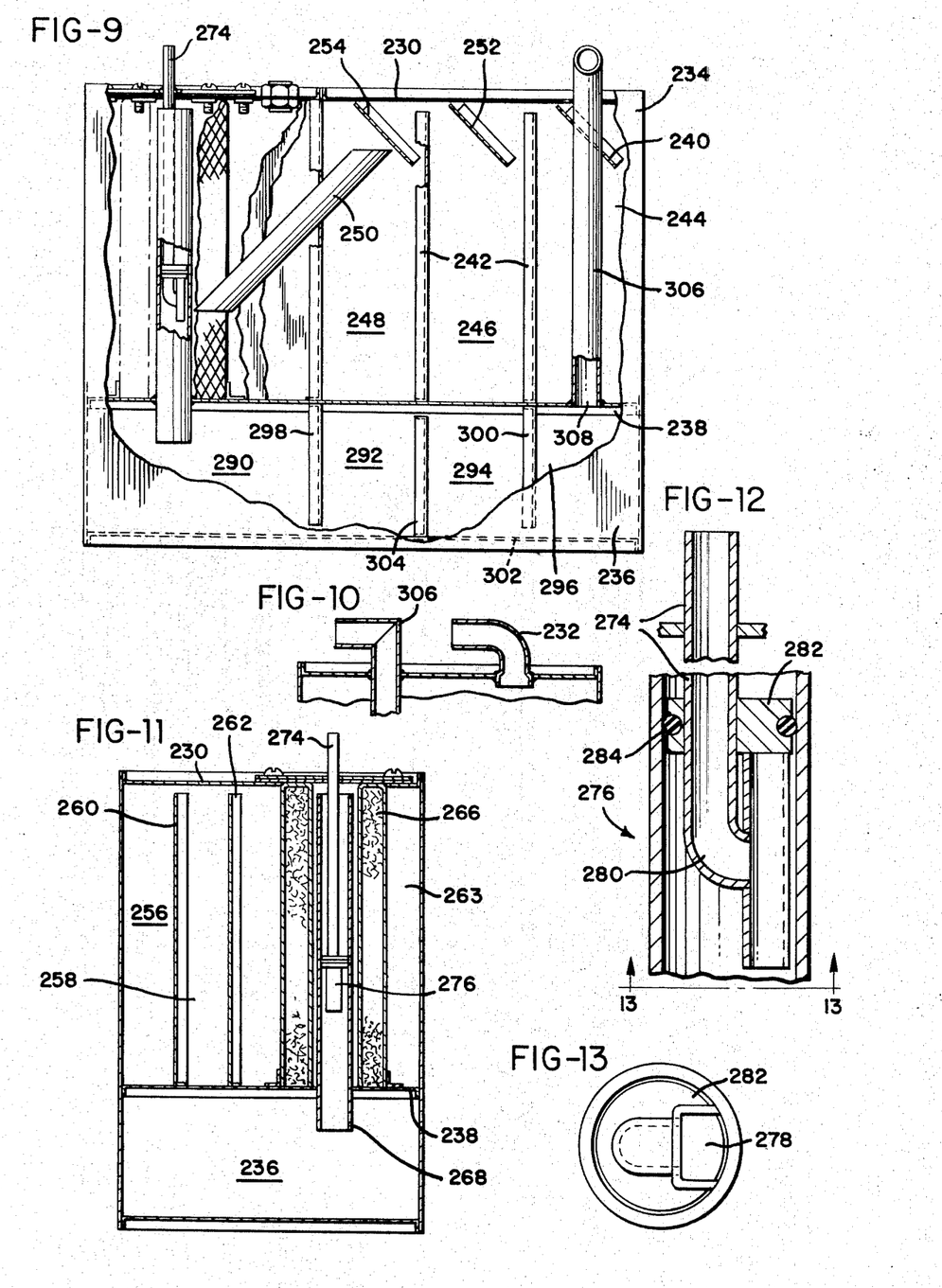
FIG. 9 is an elevational view of a treatment tank of FIG. 7 with portions removed for clarity.
FIG. 10 is a view taken of line 10—10 of FIG. 8.
FIG. 11 is a view taken of line 11—11 of FIG. 8.
FIG. 12 is a cross-sectional view showing a portion of the filter and aspirator.
FIG. 13 is a view taken on line 13—13 of FIG. 12.

It will be apparent from FIG. 9 of the drawings, that as the level of slurry deposited in the first subsection 244 rises to the upper edge of the first weir 242 a portion of the solids contained therein will settle out. Therefore, as the slurry passed from the first subsection 244 downstream thereof, a portion of the solids contained therein will settle out in each of the separating subsections. Of course, as the slurry progresses downstream for each of the weirs 242 it will be deflected by the deflectors 252 and 254 to prevent the flow of slurry from disturbing the settlement in the subsections, by causing too much turbulence.

Figure 8:
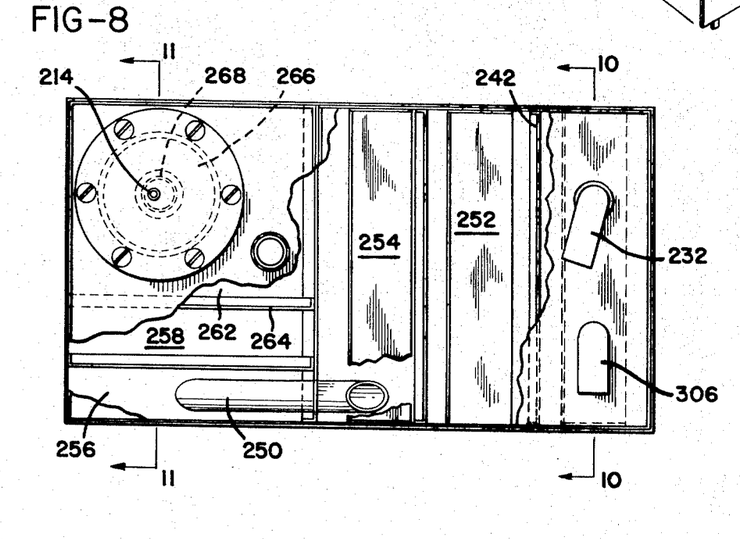
FIG. 8 is a plan view of the treatment tank of FIG. 7 with portions removed for clarity.

Pipe 250 conveys the slurry from the separator subsection 248 to an additional separating subsection 256, as best seen in FIGS. 8 and 11 of the drawings. Subsection 256 is separated from subsection 258 by means of a weir 260 and subsection 258 is separated from a filter chamber 263 by means of a weir 264. Positioned within the filter chamber is a cylindrical filter 266 which extends from the horizontally extending wall 238 upwardly to the top wall 230.

Mounted within the filter 266 in spaced relationship to the interior surface thereof is a standpipe 268. The upper end of the standpipe 268 is spaced beneath the top of the treatment tank and its lower end extends through an opening through the wall 238 into the lower section 236 of the treatment tank.

A supply of chemical additive for treating the liquid waste material is shown at 270 in FIG. 7 of the drawings and the additive contained thereby, which may be in liquid form, is conveyed by means of a conduit 272 to an upstanding tube 274 mounted within the standpipe 268, as seen in FIG. 11 of the drawings.

Pipe 274 terminates at its lower end in an aspirator 276 which channels liquid flow through the standpipe 268 through an opening 278 crossing the mouth 280 of the aspirator. The remaining portion of the standpipe is closed by a block member 282 and sealed by means of an O-ring 284. A valve 286 is mounted in the additive supply line 272 and is controlled through the terminal block 288.

Conveniently, actuation of the valve 286 can be tied in with the limit switch 218 so that valve 286 may be actuated when the foot pedal 214 is depressed. In any case, the valve 286 will allow the additive to flow from tank 270 to aspirator 276, from whence it will be drawn by the flow of effluent down the standpipe 268 for mixture in the lower or mixing section 236 of the treatment tank.

Mixing section 236 is divided, as best seen in FIG. 9 of the drawings, into a plurality of mixing subsections 290, 292, 294, and 296. It will be noted that dividing walls 298 and 300 extend from the horizontal wall 238 downwardly to a point short of a bottom wall 302 of the treatment tank, while dividing wall 304 extends from the bottom wall 302 to a point short of the horizontal wall 238. This construction causes the flow of liquid effluent and sterilizing additive to alternately flow upwardly and downwardly to provide a more thorough mixing of additive and effluent to insure that the latter is pathogenically harmless.

A discharge pipe 306 communicates with a discharge opening 308 through the horizontal wall 238 in the last mixing subsection 296. Discharge pipe 306 extends upwardly through the upper section 234 and through an opening in the top wall 230. With the above construction it will be seen that any solid materials deposited in the bowl 204 will be flushed therefrom by means of flushing liquid admitted through the ring 208 controlled by the valve 212 which is opened by depressing the foot pedal 214.

Depressing the foot pedal 214 also causes the macerator pump to be energized and opens the valve 286 in the additive supply line 272. Thus, the solid waste material will break down and mix with liquid wastes and flushing liquid to form a pumpable slurry which is directed through the line 232 into the upstreammost one of the separating chambers 234. As the slurry passes from the upstreammost chamber 234 to the downstreammost subsetion 258, the consistency thereof will be decreased, so that a low consistency slurry is delivered to the filter chamber 262.

The filter 266 removes substantially all remaining solids to provide a substantially liquid effluent to the standpipe 268. This effluent flows over the upper edge of the stand-pipe, and as it passes therethrough into the mixing section 236, it draws additive from the tube 274 by means of the aspirator 276. As a result, effluent and additives are delivered to the mixing section and are thoroughly mixed as they pass downstream to the mixing subsection 296. After the system has been in use for some time, pumping of a charge of raw slurry into the treatment tank will cause treated effluent to be discharged by displacement through the discharge pipe 306 and out of the system.

Solid materials, of course, are retained in the upper section of the treatment tank and are removed from the system during periodic servicing thereof. To facilitate servicing the entire treatment tank 224 is mounted on rails 308 to allow it to be slid into or out of the housing 202 when the access panel 310, or a similar panel which may be mounted on the opposite side, is removed.

From the above it will be seen that the present invention provides a self-contained waste treatment system which is extremely compact and ideally suited for use in mobile environments.

While the methods and froms of apparatus herein described constitute preferred embodiments of the invention, it is to be understood that the invention is not limited to these precise methods and form of apparatus, and that changes may be made therein without departing from the scope of the invention.

What is claimed is:

1. A waste treatment system comprising:
   a. collection means for receiving waste materials including untreated solid wastes,
   b. means for admitting a flushing liquid to said collection means to flush said waste materials therefrom,
   c. a treatment tank having an upper section and a lower section disposed beneath said upper section,
   d. macerating and pumping means for macerating said solid wastes to form with said flushing liquid a pumpable slurry and pumping said slurry to said treatment tank,
   e. means interconnecting said collection means and said macerating and pumping means for conveying said waste materials flushed from said collection means to said macerating and pumping means,
   f. means interconnecting said macerating and pumping means and said treatment tank for conveying said slurry from said macerating and pumping means to said treatment tank,
   g. means in said upper section of said treatment tank for separating a substantial portion of the solids in said slurry from the remainder thereof to form a substantially solids free effluent,
   h. means for transferring said effluent after separation thereof from said slurry by gravity flow from said upper section to said lower section,
   i. means for ejecting a purifying additive into said lower section of said treatment tank with said separated effluent,
   j. means in said lower section of said treatment tank for receiving a purifying additive and mixing said purifying additive with said effluent and retaining the mixture thereof in said treatment tank an appreciable time to allow said effluent to be treated by said additive, and
   k. means for thereafter discharging from said system through displacement by an incoming charge of waste material said mixture of additive and treated effluent.

2. The system of claim 1 wherein:
   a. said discharge means includes a discharge conduit communicating with said lower chamber and extending upwardly through said upper chamber.

3. The system of claim 1 wherein:
   a. said mixing means comprises means dividing said lower section into a plurality of serially interconnected mixing compartments.

4. The system of claim 3 further comprising:
   a. substantially cylindrical filtering means positioned in said upper section of said treatment tank,
   b. said transferring means communicating with the interior of said cylindrical filter and said lower section to transfer said effluent from said upper to said lower section.

5. The system of claim 4 wherein:
 a. a plurality of walls sub-divided said lower section into a plurality of subsections,
 b. openings through said walls placing said subsections in serial communication,
 c. an upstream one of said subsections communicating with the interior of said filter, and
 d. a downstream one of said subsections communicating with said discharging means.

6. The system of claim 1 wherein:
 a) said separating means comprises a plurality of baffles subdividing said upper section into a plurality of settling chambers.

7. The system of claim 1 wherein said ejecting means comprises:
 a. a supply reservoir for said additive,
 b. an aspirator mounted within said cylindrical filter, and
 c. conduit means interconnecting said reservoir and said aspirator for withdrawing a charge of said additive from said reservoir in response to effluent flow in said interior of said filter around said aspirator.

8. The system of claim 1 wherein:
 a. said separating means comprises screen means interposed between said filtering means and said macerating and pumping means.

9. The system of claim 8 wherein:
 a. said screen means comprises a plurality of screens,
 b. said screens having progressively smaller openings therethrough from said macerating and pumping means to said filter means.

10. The system of claim 8 further comprising:
 a. spray means directed at an upstream one of said screen means and communicating with said macerating and pumping means to direct said slurry against said screen means.

11. The system of claim 1 wherein said means for ejecting a purifying additive into said treatment tank comprises:
 a. a supply reservoir, and
 b. means for feeding additive from said supply reservoir to said lower section of said treatment tank.

12. The system of claim 11 wherein said feeding means comprises:
 a. a holding tank,
 b. means for transferring said additive from said reservoir to said holding tank, and
 c. a conduit interconnecting said holding tank and said lower section of said treatment tank.

13. The system of claim 12 further comprising:
 a. a one way valve in said conduit allowing flow from said holding tank to said lower section of said treatment tank, and
 b. a one way vent valve in said treatment tank venting inwardly into said tank.

14. A waste treatment system comprising:
 a. a bowl for collecting liquid and solid wastes,
 b. means for admitting a flushing liquid to said bowl to flush said wastes therefrom,
 c. a macerator pump for receiving said wastes and said flushing liquid, macerating them into a pumpable slurry and pumping said slurry downstream thereof,
 d. a treatment tank downstream of said macerator pump,
 e. a substantially horizontal wall dividing said treatment tank into upper and lower chambers,
 f. a cylindrical filter mounted in said upper chamber,
 g. a plurality of screens positioned about said filter in encircling relationship thereto,
 h. a spray pipe having an inlet in communication with said macerator pump to receive said slurry therefrom and a plurality of outlets therefrom in said treatment tank directed at the outer surface of the outermost of said encircling screens,
 i. a plurality of substantially vertical walls dividing said lower section of said treatment tank into a plurality of serially interconnected, mixing subsections,
 j. means defining an opening in said horizontal wall in an area bounded by the interior surface of said cylindrical filter,
 k. a one way vent valve in said treatment tank allowing positive pressure in said treatment tank,
 l. means defining a discharge opening in said horizontal wall from said lower section of said treatment tank,
 m. a discharge pipe extending from said opening upwardly through said upper chamber of said treatment tank,
 n. a supply reservoir for a supply of purifying additive,
 o. a holding tank positioned beneath said reservoir,
 p. a solenoid actuated valve interconnecting said reservoir and said holding tank,
 q. a conduit interconnecting said holding tank and said lower section of said treatment tank,
 r. a one way valve in said conduit permitting flow from said holding tank to said treatment tank, and
 s. control means permitting substantially simultaneous admission of said flushing liquid to said bowl, energization of said macerator pump, and opening of said solenoid actuated valve.

* * * * *